(12) United States Patent
Desai et al.

(10) Patent No.: US 12,105,520 B2
(45) Date of Patent: Oct. 1, 2024

(54) PROXY POSITION DETERMINATION FOR AGRICULTURAL VEHICLES

(71) Applicant: CNH Industrial America LLC, New Holland, PA (US)

(72) Inventors: Pinakin Desai, Naperville, IL (US); Christopher Hundley, New Holland, PA (US); Robert A. Zemenchik, Fair Oaks, CA (US)

(73) Assignee: CNH Industrial America LLC, New Holland, PA (US)

( * ) Notice: Subject to any disclaimer, the term of this patent is extended or adjusted under 35 U.S.C. 154(b) by 97 days.

(21) Appl. No.: 17/559,261

(22) Filed: Dec. 22, 2021

(65) Prior Publication Data

US 2023/0195136 A1    Jun. 22, 2023

(51) Int. Cl.
*G05D 1/02* (2020.01)
*A01B 79/00* (2006.01)
*G05D 1/00* (2006.01)

(52) U.S. Cl.
CPC ......... *G05D 1/0276* (2013.01); *A01B 79/005* (2013.01); *G05D 1/0278* (2013.01)

(58) Field of Classification Search
CPC ............... G05D 1/0276; G05D 1/0278; G05D 2201/0201; A01B 79/005; A01B 69/004;
(Continued)

(56) References Cited

U.S. PATENT DOCUMENTS 6,463,374 B1   10/2002  Keller et al.
7,383,114 B1    6/2008  Lange et al.
(Continued)

FOREIGN PATENT DOCUMENTS

WO    WO-2005/119386    12/2005

OTHER PUBLICATIONS

"From GPS to GNSS: Enhanced Functionality of GPS-Integrated Systems in Agricultural Machines" by Pedro Andrade-Sanchez et al. (Year: 2012).*
Firmware ALIGN brochure, NovAtel Inc., Nov. 2015, pp. 1-2.
(Continued)

*Primary Examiner* — Rodney A Butler
(74) *Attorney, Agent, or Firm* — Rickard K. DeMille; Rebecca L. Henkel; Peter K. Zacharias

(57) ABSTRACT

A system for providing a position for an agricultural vehicle. The system includes a first receiver structured to be coupled to a first vehicle, the first receiver configured to receive position correction information from an external source and determine a first position of the first receiver in three dimensions using the position correction information. The system also includes a second receiver structured to be coupled to a second vehicle and configured to determine a second position of the second receiver, wherein the first receiver is configured to determine the first position using the position correction information at a higher level of accuracy than the second receiver is configured to determine the second position. The system also includes one or more processing circuits, each processing circuit including a processor and a memory, the memory having instructions stored thereon that, when executed by the processor, cause the processing circuit to determine a position of the second vehicle in three dimensions, including a vertical position of at least a portion of the second vehicle, using the position correction information received by the first receiver.

18 Claims, 5 Drawing Sheets

(58) Field of Classification Search
CPC ........ G01S 19/14; G01S 19/071; G01S 19/09;
G01S 19/51; G01S 19/43
See application file for complete search history.

(56) References Cited

U.S. PATENT DOCUMENTS

| | | |
|---|---|---|
| 7,490,678 B2 | 2/2009 | Unruh et al. |
| 8,234,010 B2 | 7/2012 | Thompson et al. |
| 9,374,939 B2 | 6/2016 | Pickett et al. |
| 9,541,648 B2 | 1/2017 | Ralphs et al. |
| 10,168,714 B2 | 1/2019 | Webber et al. |
| 2008/0195268 A1 | 8/2008 | Sapilewski et al. |
| 2012/0215410 A1 | 8/2012 | McClure et al. |
| 2016/0255758 A1 | 9/2016 | Laurichesse |
| 2021/0283973 A1* | 9/2021 | Birkland ................ E02F 9/262 |

OTHER PUBLICATIONS

John Deere Guidance Systems, accessed on Mar. 18, 2021.
European Search Report and Written Opinion dated May 25, 2023 for related European Patent Application No. 22213044 (9 pages).

* cited by examiner

PROXY POSITION DETERMINATION FOR AGRICULTURAL VEHICLES

BACKGROUND

The present disclosure relates generally to the field of position determination for industrial vehicles, such as agricultural or construction vehicles or other mobile/movable equipment. More specifically, in some embodiments, the present disclosure relates to systems and methods for improving the drainage of rainwater or the efficiency of irrigation systems or the tillage of agricultural fields.

SUMMARY

One embodiment of the present disclosure is a system for providing a position for an agricultural vehicle. The system includes a first receiver structured to be coupled to a first vehicle, the first receiver configured to receive position correction information from an external source and determine a first position of the first receiver in three dimensions using the position correction information. The system also includes a second receiver structured to be coupled to a second vehicle and configured to determine a second position of the second receiver, wherein the first receiver is configured to determine the first position using the position correction information at a higher level of accuracy than the second receiver is configured to determine the second position. The system also includes one or more processing circuits, each processing circuit including a processor and a memory, the memory having instructions stored thereon that, when executed by the processor, cause the processing circuit to determine a position of the second vehicle in three dimensions, including a vertical position of at least a portion of the second vehicle, using the position correction information received by the first receiver.

Another embodiment of the present disclosure is a method for providing a position for an agricultural vehicle. The method includes receiving, by a first receiver coupled to a first vehicle, position correction information from an external source, determining, by the first receiver, a first position of the first vehicle in three dimensions using the position correction information, determining, by a second receiver coupled to a second vehicle, a second position of the second receiver, determining a position of the second vehicle in three dimensions, including a vertical position of at least a portion of the second vehicle, using the position correction information received by the first receiver, and controlling at least a portion of an operation of the second vehicle based on the determined position of the second vehicle in three dimensions.

Another embodiment of the present disclosure is a computer readable media for providing a position for an agricultural vehicle. The computer readable media includes a processing circuit including one or more processors and memory storing instructions. When the instructions are executed by the one or more processors, the one or more processors to perform operations including: receiving, by a first receiver coupled to a first vehicle, position correction information from an external source; determining, by the first receiver, a first position of the first vehicle in three dimensions using the position correction information; determining, by a second receiver coupled to a second vehicle, a second position of the second receiver; determining a position of the second vehicle in three dimensions, including a vertical position of at least a portion of the second vehicle, using the position correction information received by the first receiver; and controlling at least a portion of an operation of the water management implement based on the determined position of the water management implement in three dimensions, controlling the operation comprising controlling the vertical position of the at least a portion of the water management implement based on the determined position.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
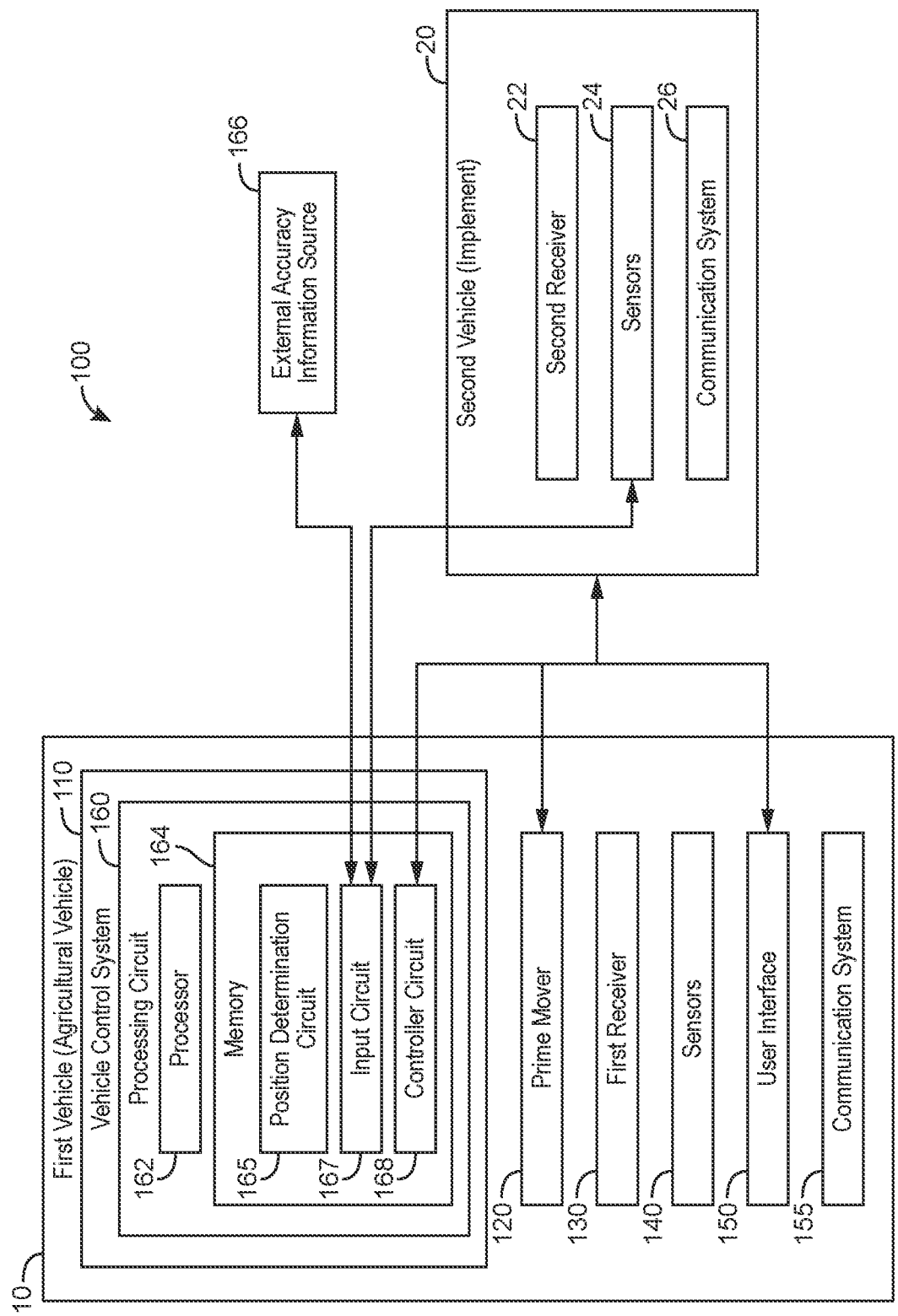
FIG. 1 is a block diagram of a system including a first vehicle (e.g., an agricultural vehicle) and a second vehicle (e.g., an implement), according to an exemplary embodiment.

It will be recognized that the Figures are schematic representations for purposes of illustration. The Figure are provided for the purpose of illustrating one or more implementations with the explicit understanding that the Figures will not be used to limit the scope or the meaning of the claims.

DETAILED DESCRIPTION

Referring generally to the FIGURES, described herein are systems and methods of determining a position of an industrial vehicle, such as an agricultural or construction vehicle. In some such implementations, the systems and methods described herein may determine accurate positions for farming equipment for water management applications such as surface grading, land leveling, ditching and tiling drainage, etc. In some implementations, an implement may be drawn behind a tractor to level an agricultural field in order to improve the drainage of rainwater. As another example, an implement may be drawn behind a tractor to create a trench in which drainage pipe may be laid in order to increase the efficiency of irrigation. In both of these examples, the tractor and implement should be moved/located precisely for the water management to be effective. One solution may be to include expensive and complex receivers attached to both the tractor and the implement, expensive receiver RTK accuracy unlocks for both receivers, and a correction signal subscription for both receivers. It would be desirable to provide more accurate operation without expensive equipment or subscriptions.

For the purposes of the present disclosure, the term "vehicle" refers to any equipment that can be moved (e.g., within a field), regardless of whether the equipment includes a prime mover or other device configured to move the equipment under its own power. For example, the term "vehicle" applies to powered equipment such as a tractor, combine, harvester, etc., but the term "vehicle" also applies to equipment that moves through the assistance of another vehicle, such as various agricultural or construction implements that are attached/coupled to another vehicle (e.g., implements such as irrigation machinery, soil cultivation implements, planting equipment, harvesting implements, etc. that are attached to and moved by a tractor or other vehicle).

Farming equipment with particular types of position determination devices (e.g., GPS receivers, antennae, etc.) may be able to determine the positioning of agricultural vehicles (e.g., tractors, implements, etc.) within a range of plus or minus 1 meter. For some farming applications, this level of accuracy is adequate, but other farming applications that have a lower tolerance for error (e.g., water management applications including surface leveling, irrigation trenching, and drainage tiling) may require more accurate precision farming equipment. More specifically, some farming applications require more accurate precision determination in the vertical direction. In these cases, a user may purchase real-time kinematic (RTK) accuracy capable receivers, or unlock such capabilities on existing receivers. RTK positioning utilizes survey data to correct for errors in satellite navigation (GPS/GNSS) systems. Receiver RTK accuracy capabilities may increase the accuracy of the receiver's ability to determine the position of an agricultural vehicle from within one meter of the vehicle's actual position to within two to four or five centimeters of the vehicle's actual position.

This increased accuracy may be provided to both the agricultural vehicle and the implement by using two receivers that each include advanced capabilities such as RTK accuracy. For example, a first receiver may be coupled to an agricultural vehicle (e.g., a tractor). The first receiver may include a receiver RTK accuracy activation and a correction signal subscription. These capabilities allow the receiver to provide a much more granular, accurate position for the vehicle, but substantially increase the cost and complexity of the receiver. Additionally, if the application includes a second vehicle, such as an agricultural implement or a second powered vehicle such as a haul vehicle, a second similarly costly and complex receiver may be required for that second vehicle. In some such circumstances, separate subscriptions (e.g., RTK unlock and correction signal subscriptions) may be required for both the first and second vehicle receivers.

According to various implementations, the systems and methods of the present disclosure provide a methodology for determining an accurate position/location for a second vehicle (e.g., implement or powered vehicle) using a first receiver (e.g., more complex, costly receiver) on a first vehicle that is configured to communicate with a second receiver (e.g., less complex, costly receiver) and either determine a more accurate, granular position for the second receiver and second vehicle or provide the second receiver/vehicle to determine its own accurate position. In some such implementations, a more accurate and granular position of the second receiver and second vehicle could be determined than would be possible to determine using the less complex second receiver alone without requiring that the second vehicle be equipped with a more complex and costly receiver or requiring the purchase of a second receiver RTK accuracy unlock or a second correction signal yearly subscription. Instead, the system may utilize a first receiver with the more complex position determination circuitry/software (e.g., including a receiver RTK accuracy unlock and a correction signal yearly subscription and/or configured to determine a more accurate position using an external data source). In various implementations, the systems and methods described herein may be utilized to determine an accurate and granular position of a second vehicle (e.g., implement) in three dimensions, including both lateral (e.g., latitude and longitude) and vertical (e.g., altitude) positions.

In some implementations, the vehicle control system may use position of the agricultural vehicle and the implement to determine control inputs for the agricultural vehicle and/or the implement in order to execute a water management application plan. A water management application plan refers to a predetermined plan created by a user (e.g., a farmer) that maps out an agricultural field to be transformed using a water management practice such as surface leveling, soil trenching, drainage tiling, etc., by an agricultural vehicle and an implement. In some implementations, the position may be used by the vehicle control system to implement the control signals in an automated fashion (e.g., without intervention by a user).

Hereinafter, example embodiments will be described in more detail with reference to the accompanying drawings. Referring now to FIG. 1, a block diagram of an industrial vehicle system 100 is shown, according to an exemplary embodiment. In some implementations, industrial vehicle system 100 may be an agricultural vehicle system including multiple vehicles (e.g., one powered vehicle such as a tractor and an unpowered vehicle such as an implement moved under the power of the tractor, two powered vehicles, etc.). In some such implementations, industrial vehicle system 100 may be a water management system. In some implementations, industrial vehicle system 100 may be a construction vehicle system including multiple vehicles (e.g., one powered construction vehicle and an unpowered vehicle such as an implement moved under the power of the powered construction vehicle, two powered construction vehicles, etc.).

Industrial vehicle system 100 is shown to include a first vehicle (e.g., an agricultural vehicle) 10 and a second vehicle (e.g., an implement) 20. In some embodiments, first vehicle 10 may be an agricultural vehicle such as a tractor. In some embodiments, second vehicle 20 may be independently moving/operating vehicle, such as a haul vehicle hauling crops harvested by a harvesting vehicle. In other embodiments, second vehicle 20 may be an agricultural implement with wheels or other moving devices (e.g., tracks) that may be coupled to the first vehicle. For example, the second vehicle 20 may be a power ditcher, a trencher, a tile plow, a tillage tool etc. In various embodiments, first vehicle 10 is associated with one or more second vehicles 20. For example, a first vehicle 10 may be a leader vehicle (e.g., a harvester) and second vehicle 20 may be a follower vehicle (e.g., a haul vehicle) configured to communicate with the first vehicle 10 via a vehicular communication system (e.g., communication system 155). While the vehicle control system of the present disclosure is described in relation to agricultural vehicles, it should be understood that the vehicle control system is usable with other vehicles (e.g., non-agricultural vehicles) and that such embodiments are within the scope of the present disclosure. As a non-limiting example, in a landscaping context, first vehicle 10 may be a riding lawn mower and second vehicle 20 may include a debris collection system attached to the riding lawn mower. As another non-limiting example, in a snow-clearing context, first vehicle 10 may be a winter service vehicle and the second vehicle 20 may include a snowplow being pulled behind or pushed in front of the winter service vehicle.

First vehicle 10 includes vehicle control system 110, prime mover 120, first receiver 130, sensor(s) 140, user interface 150, and communication system 155. Vehicle control system 110 may control operation of the first vehicle 10 and the second vehicle 20 based on the accurate positions of the receivers of the vehicles to execute one or more vehicle operations, such as a water management plan. In various embodiments, vehicle control system 110 is physically located with first vehicle 10. For example, vehicle control system 110 may be or include a hardware component installed in or on first vehicle 10. Additionally or alternatively, part or all of vehicle control system 110 may be located separately of first vehicle 10. For example, in some implementations, portions of vehicle control system 110 may be implemented within a remote processing system (e.g., a server, two or more computing systems/servers in a distributed computing implementation, a cloud-based processing system, etc.) configured to receive input from industrial vehicle system 100 and generate data and/or control first vehicle 10 remotely.

Prime mover 120 may generate mechanical energy to operate first vehicle 10. For example, prime mover 120 may be or include an internal combustion engine. Additionally or alternatively, prime mover 120 may be or include an electric motor (e.g., may be a fully electric or hybrid electric drivetrain including only one or more motors or a combination of one or more motors and one or more engines). In various embodiments, prime mover 120 is coupled to a frame of first vehicle 10 and configured to provide power to a plurality of tractive elements (e.g. wheels, etc.). In various embodiments, prime mover 120 utilizes one or more fuels and/or energy storage systems (e.g., rechargeable batteries, etc.). For example, prime mover 120 may utilize diesel, gasoline, propane, natural gas, hydrogen, lithium-ion batteries, nickel-metal hydride batteries, lithium-ion polymer batteries, lead-acid batteries, nickel-cadmium batteries, and/or the like as energy sources.

First receiver 130 may be a global navigation satellite system (GNSS) receiver (e.g., GPS receiver) structured to determine the position of the first vehicle 10. The first receiver 130 may include an advanced positioning capability that allows the first receiver 130 to determine a position of the first receiver 130 with a high level of specificity/accuracy. For example, in some implementations, first receiver 130 may include a receiver RTK accuracy capability (e.g., an RTK accuracy unlock, such as a capability unlocked via a subscription), for example, a software and/or firmware upgrade for the receiver that increases the accuracy of the position and/or orientation determination for the first vehicle 10. In other embodiments, the RTK accuracy may already be included in the first receiver 130, and a user may be required to purchase an "accuracy unlock" to access the RTK accuracy capabilities of the first receiver 130. The RTK accuracy unlock may utilize position and orientation data from an external source (e.g., fixed ground-based base station, particular satellite, etc.) to increase the accuracy of the position determined by the first receiver 130. In some implementations, first receiver 130 may have a first, less precise level of accuracy in absence of activation/unlocking of the advanced positioning capability (e.g., RTK unlock), and a second, more precise level of accuracy with activation/unlocking of the advanced positioning capability (e.g., 2-4 cm. In some implementations, the first receiver 130 may additionally include a correction signal subscription that further increases the accuracy of the position and/or orientation data collected from the first vehicle 10. The RTK accuracy capabilities may need to receive "RTK corrections" from an RTK base station in order to accurately determine the position of the first receiver. The RTK corrections may be received by the receiver over one or more communication networks (e.g., internet, Wi-Fi, radio, Bluetooth, etc.). Many suppliers of RTK corrections may charge a subscription (i.e. a recurring paid service for some period of time). In some implementations, first receiver 130 may include other types of position determination circuitry and/or software.

Sensor(s) 140 may monitor one or more parameters associated with first vehicle 10. For example, sensor(s) 140 may monitor operation of prime mover 120 (e.g., torque, temperature, fuel level, airflow, etc.). Additionally or alternatively, sensor(s) 140 may monitor an environment of first vehicle 10. Sensor(s) 140 may include engine sensors, transmission sensors, chassis sensors, safety sensors, driver assistance sensors, passenger comfort sensors, entertainment systems sensors, and/or the like. In some embodiments, sensor(s) 140 receive input from external sources. For example, sensor(s) 140 may include position sensors configured to communicate with one or more beacons located throughout a farm field to determine a location of first vehicle 10. In various embodiments, sensor(s) 140 are physically located on or in first vehicle 10. For example, sensor(s) 140 may include a chassis mounted infra-red sensor configured to measure crop health. Additionally or alternatively, sensor(s) 140 may be located separately of first vehicle 10. In some embodiments, sensor(s) 140 may include hardware and/or software components. For example, sensor(s) 140 may include a GPS receiver configured to receive positional data and a software component configured to determine positional parameters associated with first vehicle 10 (e.g., pose, speed, yaw, trajectory, etc.) based on the positional data. As another example, sensor(s) 140 may include an optical device (e.g., a camera, LIDAR sensor, etc.) configured to capture image data.

User interface 150 may facilitate user interaction with first vehicle 10 and/or vehicle control system 110. User interface 150 may include elements configured to present information to a user and receive user input. For example, user interface 150 may include a display device (e.g., a graphical display, a touchscreen, etc.), an audio device (e.g., a speaker, etc.), manual controls (e.g., manual steering control, manual transmission control, manual braking control, etc.), and/or the like. As another example, the user may enter a water management plan into the user interface 150. The water management plan may be used to determine control inputs for the first vehicle 10 and/or the second vehicle 20 as will be described in more detail below. User interface 150 may include hardware and/or software components. For example, user interface 150 may include a microphone configured to receive user voice input and a software component configured to control first vehicle 10 based on the received user voice input. In various embodiments, user interface 150 presents information associated with the operation of first vehicle 10 and/or vehicle control system 110 to a user and facilitates user control of operating parameters. For example, user interface 150 may display operational parameters (e.g., fuel level, seed level, penetration depth of ground engaging tools, guidance swath, etc.) on a touchscreen display and receive user control input via the touchscreen display.

Communication system 155 may facilitate communication between first vehicle 10 and/or vehicle control system 110 and external systems (e.g., second vehicle 20, etc.). Communication system 155 may be or include wired or wireless communications interfaces (e.g., jacks, antennas, transmitters, receivers, transceivers, wire terminals, etc.) for conducting data communications within industrial vehicle system 100 and/or with other external systems or devices. In various embodiments, communications via communication system 155 is direct (e.g., local wired or wireless communications). Additionally or alternatively, communications via communication system 155 may utilize a network (e.g., a WAN, the Internet, a cellular network, a vehicle-to-vehicle network, etc.). For example, vehicle control system 110 may communicate with a decision support system (DSS) using a 4G and/or 5G connection (e.g., via a 4G or 5G access point/small cell base station, etc.) and may communicate with second vehicle 20 using a dedicated short-range communication channel (e.g., a vehicular ad-hoc network, etc.). In some embodiments, communication system 155 facilitates vehicle-to-vehicle (V2V) and/or vehicle-to-everything (V2X) communication. For example, communication system 155 may facilitate communication between first vehicle 10 and second vehicle 20 using the IEEE 802.11p standard (e.g., a wireless access in vehicular environments (WAVE) vehicular communication system). In some embodiments, first vehicle 10 communicates with second vehicle 20 via Wi-Fi.

Vehicle control system 110 is also shown to include a processing circuit 160 having a processor 162 and a memory 164. In some embodiments, vehicle control system 110 includes one or more processing circuits 160 including one or more processors 162 and one or more memories 164. Each of the processors 162 can be a general purpose or specific purpose processor, an application specific integrated circuit (ASIC), one or more field programmable gate arrays (FPGAs), a group of processing components, or other suitable processing components. Each of processors 162 is configured to execute computer code or instructions stored in memory 164 or received from other computer readable media (e.g., CDROM, network storage, a remote server, etc.).

Memory 164 may include one or more devices (e.g., memory units, memory devices, storage devices, or other computer-readable media) for storing data and/or computer code for completing and/or facilitating the various processes described in the present disclosure. Memory 164 may include random access memory (RAM), read-only memory (ROM), hard drive storage, temporary storage, non-volatile memory, flash memory, optical memory, or any other suitable memory for storing software objects and/or computer instructions. Memory 164 may include database components, object code components, script components, or any other type of information structure for supporting the various activities and information structures described in the present disclosure. Memory 164 may be communicably connected to processor(s) 162 via processing circuit 160 and may include computer code for executing (e.g., by processor 162) one or more of the processes described herein.

Memory 164 is shown to include position determination circuit 165, input circuit 167, and controller circuit 168. Position determination circuit 165 may use the first receiver 130 and a second receiver 22 to generate relative position and/or orientation data between vehicles 10 and 20. More specifically, the position determination circuit 165 may use two receivers (e.g., the first receiver 130 coupled to the first vehicle 10 and the second receiver 22 coupled to the second vehicle 20) to determine position and/or orientation data for the first vehicle 10 and the second vehicle 20 relative to each other, but this description is only meant to be exemplary and not limiting. In other embodiments, the position determination circuit 165 may include more than two receivers to determine position and/or orientation data. The position determination circuit 165 may use a Global Positioning System (GPS), a Global Navigation Satellite System (GLONASS), a GNSS, and a Satellite-based Augmentation System (SBAS) technology embedded within its receivers to determine position and/or orientation data between the first receiver 130 and the second receiver 22 (and therefore between the first vehicle 10 and the second vehicle 20).

Figure 4:
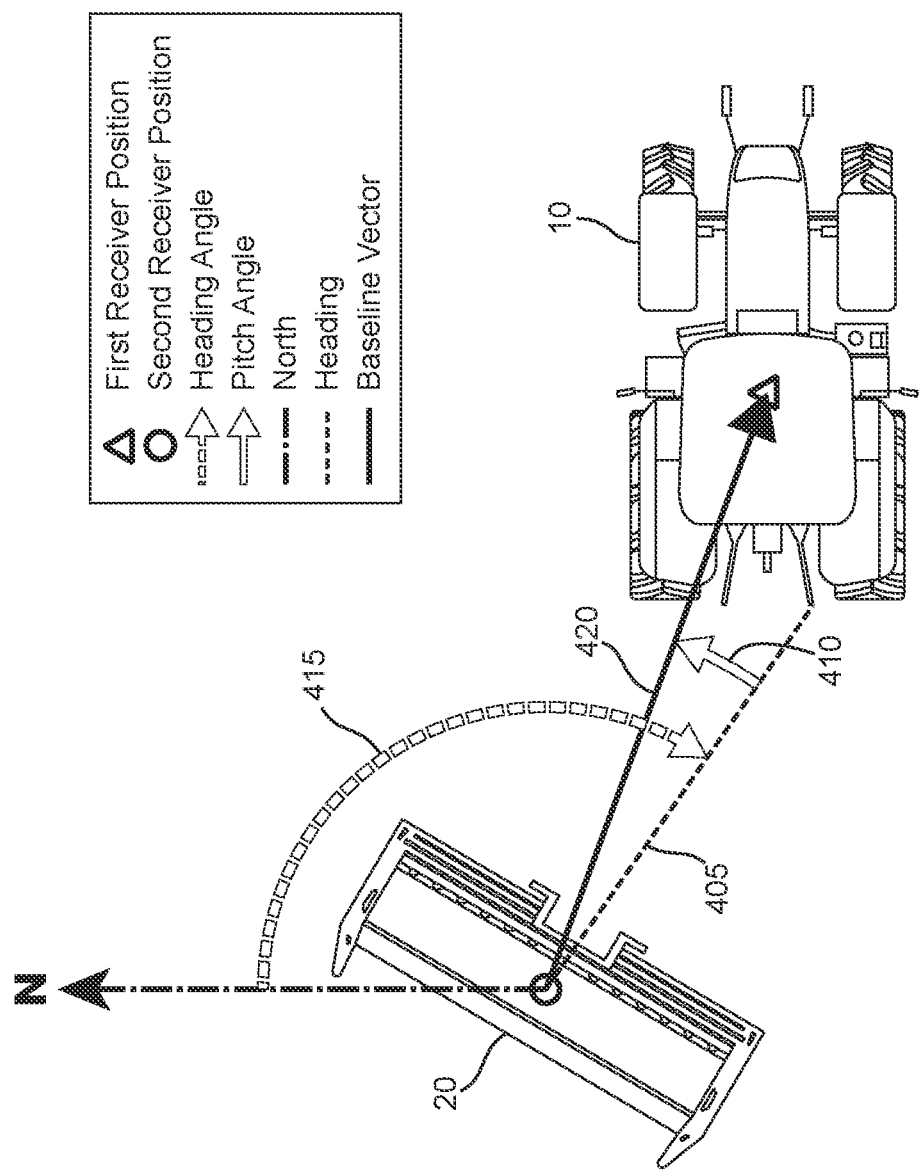
FIG. 4 is a position determination methodology for determining the position of an agricultural vehicle and an implement, according to an exemplary embodiment.

In some implementations, the position determination circuit 165 generates or receives heading, pitch, and relative or absolute separation and positioning measurements between the two receivers 130 and 22, and, therefore, between the first vehicle 10 and the second vehicle 20, in order to determine an accurate position of the first vehicle 10 and the second vehicle 20. In some implementations, the position determination circuit 165 is able to determine the positions of the receivers 130 and 22 in three dimensions, including both lateral (e.g., latitude and longitude) and vertical (e.g., altitude, height off of ground, etc.) positions. For example, FIG. 4 illustrates the heading orientation measurement 405, heading angle measurement 415, pitch angle measurement 410, and a relative separation and positioning measurement 420 between the first vehicle 10 and the second vehicle 20 that may be determined by the position determination circuit 165. In addition to determining the longitudinal and the latitudinal position of the first vehicle 10 and the second vehicle 20, the position determination circuit 165 may also determine a vertical position of the first vehicle 10 and the second vehicle 20. In some implementations, the position determination circuit 165 determines the position of the second receiver 22/second vehicle 20 using, for example, ALIGN® firmware provided by NovAtel® implemented on one or both of the receivers 130 and 22, such as by determining an accurate position of the first receiver 130 and using that position along with the relative positioning capabilities of the ALIGN® firmware to determine an accurate position of the second receiver 22. Additionally, the position determination circuit 165 may determine the absolute position of the first vehicle 10 and the second vehicle 20 using the first receiver 130 which has the RTK high accuracy capabilities, the RTK high accuracy capabilities being imparted to the second receiver 22 using, for example, ALIGN® firmware provided by NovAtel®. In other implementations, other methods of determining the position of the second receiver 22 using an accurate position of the first receiver 130 and relative positioning between the first receiver 130 and second receiver 22 may be utilized.

Input circuit 167 may facilitate the receiving and processing of information from external sources by the vehicle control system 110. For example, input circuit 167 may receive position and/or orientation data from external accuracy information source 166 and/or sensor(s) 140 and 24. As a further example, input circuit 167 may receive position and/or orientation data from second vehicle 20. In some embodiments, the input circuit 167 may receive input from user interface 150. For example, a user may input a certain water management plan (e.g., a surface grading plan, a field tiling plan, etc.) which maps out how the first vehicle 10 and an second vehicle 20 may transform an agricultural field for a water management application through the user interface 150. The input circuit 167 would then receive the water management plan from the user interface 150 and store this information for use within the vehicle control system 110. In some embodiments, input circuit 167 facilitates integrating vehicle control system 110 with other systems. For example, input circuit 167 may receive position and/or orientation data from the position determination circuit 165 and may format the position and/or orientation data for controller circuit 168. As another example, position determination circuit 165 may receive position and/or orientation data from the second vehicle or the external accuracy information source through the input circuit 167.

Controller circuit 168 may facilitate control of first vehicle 10 and the second vehicle 20 by determining control inputs structured to guide operation of the prime mover 120 or the second vehicle 20. In some embodiments, controller circuit 168 may facilitate autonomous and/or semi-autonomous operation of first vehicle 10 and/or second vehicle 20. In some implementations, controller circuit 168 may provide information (e.g., warnings, alerts, data, etc.) to a user/operator of first vehicle 10 for use in manually controlling first vehicle 10. Additionally or alternatively, controller circuit 168 may receive information from external sources and operate first vehicle 10 and second vehicle 20 based on the received information. For example, controller circuit 176 may receive a water management practice implementation plan from the user interface 150 and operate first vehicle 10 and/or second vehicle 20 based on the received water management practice implementation plan.

Second vehicle 20 is shown to include second receiver 22, sensor(s) 24, and communication system 26. Second receiver 22 may be a GNSS receiver coupled to the second vehicle and structured to determine the position of the second vehicle 20. In some implementations, the second receiver 22 may have less accurate positioning capabilities than first receiver 130. For example, in some implementations, the second receiver 22 may not include a receiver RTK accuracy unlock or a correction signal subscription. Therefore, on its own, the second receiver 22 may have an accuracy of within 1 meter of the actual position as opposed to within 2 to 4 or 5 centimeters as is the case for the first receiver 130. The position determination circuit 165 described above combines the capabilities of the first receiver 130 with the second receiver 22 to provide high accuracy position and/or orientation data for the first vehicle 10 coupled to the first receiver 130 and the second vehicle 20 coupled to the second receiver relative to each other. While the position determination circuit 165 is shown as a component of the first vehicle 10, it should be understood that, in some embodiments, a separate position determination circuit 165 could be a component of the second vehicle 20 (e.g., determining the position of the second vehicle 20 using information provided from the first vehicle 10).

Sensor(s) 24 may be similar to or different from sensor(s) 140. For example, sensor(s) 24 may include position throughout a farm field to determine a location of first vehicle 10. Communication system 26 may be similar to or different from communication system 150. For example, communication system 26 may facilitate communication between second vehicle 20 and external systems (e.g., first vehicle 10, etc.). Communication system 26 may be or include wired or wireless communications interfaces (e.g., jacks, antennas, transmitters, receivers, transceivers, wire terminals, etc.) for conducting data communications within industrial vehicle system 100 and/or with other external systems or devices.

While some components are shown only as a part of the first vehicle 10, it should be understood that various components of the first vehicle 10 could be a part of the second vehicle 20, in various implementations. For example, in some implementations in which the second vehicle 10 is a powered vehicle, the second vehicle 10 may include its own controller circuit, prime mover, etc. All such modifications are contemplated within the scope of the present disclosure.

Vehicle control system 110 offers many benefits over alternative systems. An alternative method of achieving similar accuracy would be to purchase and install multiple pieces of expensive and complex precision farming equipment in order to independently accurately determine the position of a first vehicle (e.g., a tractor) and a second vehicle (e.g., an implement). For example, a user could purchase two receivers, two receiver RTK accuracy unlocks, and two yearly correction signal subscriptions and independently determine the positions of the two vehicles (e.g., the powered vehicle and the implement). However, vehicle control system 110 facilitates accurate positioning and orientation data for the first vehicle 10 and the second vehicle 20 using a receiver with advanced positioning capability on only one of the vehicles, and utilize the advanced capabilities to determine an accurate position of the second vehicle 20. Therefore, some embodiments may utilize only a portion of the more complex and expensive equipment, and thereby simplify the complicated and expensive alternative implementations.

In some implementations, the vehicle control system 110 may then use these accurate positions determined by the first and second receiver to control operation of the first vehicle 10 and the second vehicle 20 to implement a water management practice. For example, a farmer may wish to increase the rainwater drainage within a certain agricultural field that is sloped in such a way that excess water gets trapped in the middle of the field. After surveying the field, the farmer may determine that they should level the field using a scraper implement to a certain height. In this case, the vehicle control system 110 may determine control inputs such as a vertical position for the second vehicle 20, a velocity for the first vehicle 10, etc. The vehicle control system 110 may then communicate these control inputs as control signals to either the prime mover 120 or the second vehicle 20 in order to control operation of the first vehicle 10 and/or the second vehicle 20 to implement the water management practice or application. In some implementations, the vehicle control system 110 may provide the position information, or underlying information used to determine position information, to the second vehicle 20 to control its own movement (e.g., if the second vehicle 20 is a powered vehicle).

Figure 2:
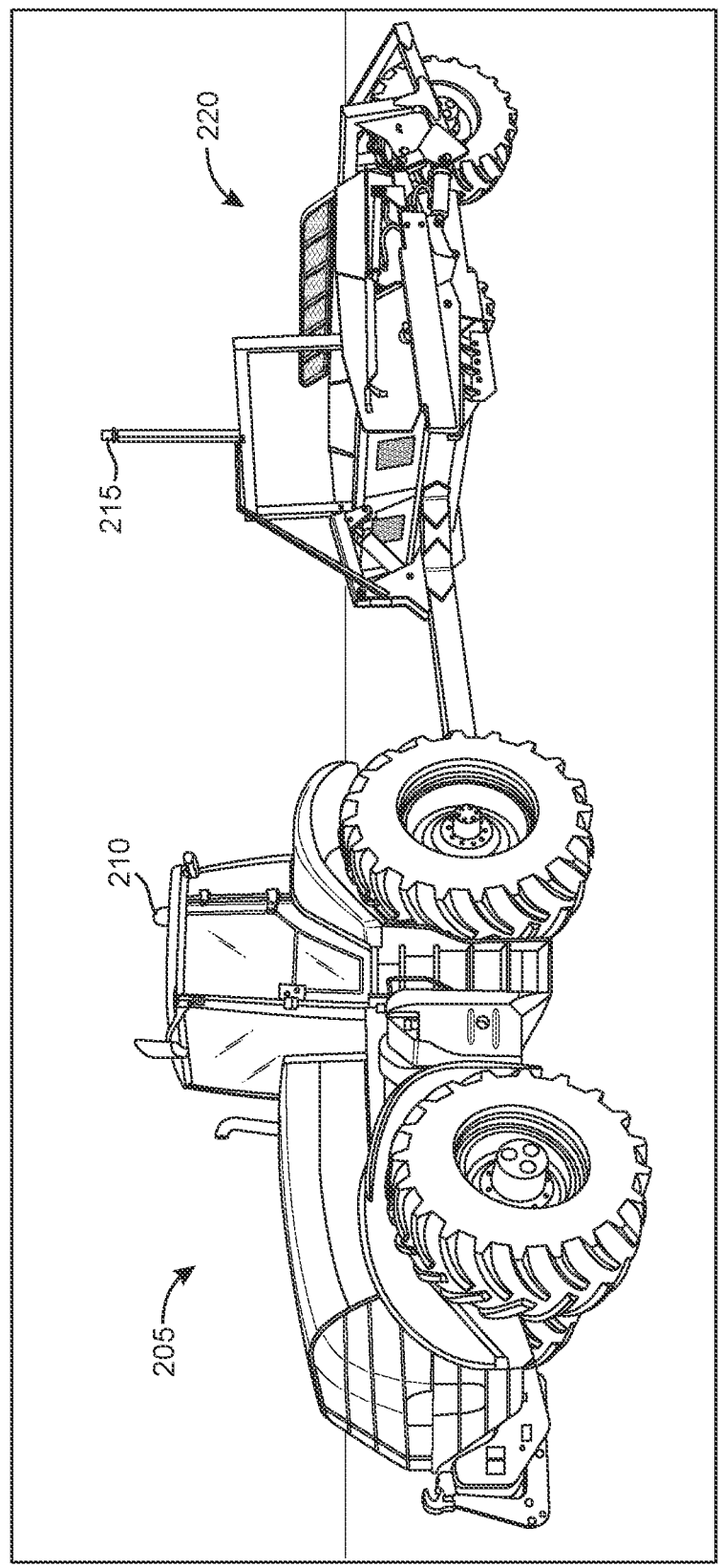
FIG. 2 is a diagram illustrating an agricultural vehicle coupled to an implement, according to an exemplary embodiment.

Referring now to FIG. 2 a diagram illustrating an example first vehicle coupled to an example implement is shown according to an exemplary embodiment. In some embodiments, the example first vehicle may be tractor 205 and the implement may be a scraper implement 220. Scraper implement 220 is structured to remove or move agricultural material (e.g. soil, rocks, plants, etc.) from a portion of an agricultural field. Scraper implement 220 may be used in a variety of water management applications including raising or lowering the surface topography or a water table for improved soil drainage and land leveling for even water coverage and uniform crops. The tractor 205 may include all the components of the first vehicle 10 described in the preceding paragraphs, in some implementations. The tractor 205 may be coupled to a receiver 210 similar to first receiver 130 described in the preceding paragraphs. The scraper implement 220 is coupled to receiver 215, which may be similar to second receiver 22 described in the preceding paragraphs. Tractor 205 coupled to receiver 210 and scraper implement 220 coupled to receiver 215 may be structured implement a water management application. Take, for example, a scenario in which a farmer may be leveling a field based on a predetermined land leveling plan determined to create a more even field that produces more uniform crops. The farmer may enter the land leveling plan into a user interface similar to user interface 150, which may be received and stored by an input circuit similar to the input circuit 167. While the farmer is operating tractor 205 and the scraper implement 220, a controller circuit similar to the controller circuit 168 may receive position and/or orientation data from a position determination circuit similar to position determination circuit 165 that indicates that the tractor 205 pulling the scraper implement 220 is causing the scraper implement 220 to veer off course (i.e., the heading position measurement of the implement does not match the route outlined in the land leveling plan). The controller circuit may then determine a control input such as a steering angle for the tractor 205 in order to pull the scraper implement 220 back on the right course. The controller circuit may then communicate the control input as a control signal to the tractor 205 so that the controller circuit 168 may control operation of the tractor and the implement based on the control input.

Figure 3:
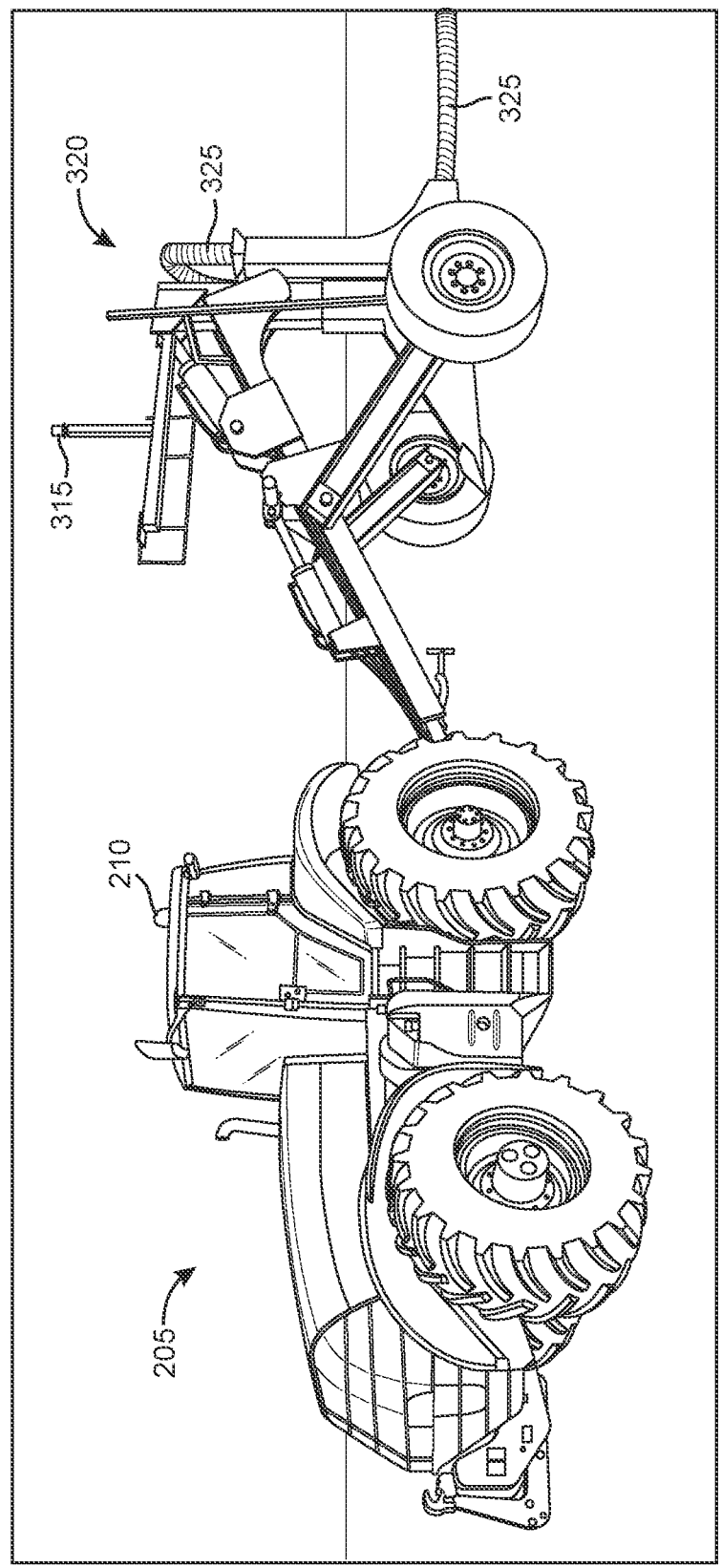
FIG. 3 is a diagram illustrating another agricultural vehicle coupled to an implement, according to another exemplary embodiment.

Referring now to FIG. 3 a diagram illustrating another example of a first vehicle coupled to an implement is shown according to an exemplary embodiment. In some embodiments, first vehicle may be tractor 305 and the implement may drainage implement 320. Drainage implement 320 is structured to create a drainage trench and lay drainage tile 325 within the drainage trench created by the drainage implement. Drainage implement 320 may be used in a variety of water management applications including drainage tile installation in order to remove excess water from agricultural fields. The tractor 305 may include all the components of the first vehicle 10 described in the preceding paragraphs. The tractor 305 may be coupled to a receiver 310 similar to first receiver 130 described in the preceding paragraphs. The drainage implement 320 is operably coupled to receiver 315 similar to second receiver 22 described in the preceding paragraphs. Tractor 305 coupled to receiver 310 and drainage implement 320 coupled to receiver 315 may be structured implement a water management application. Take for example a scenario in which a farmer may be laying drainage within an agricultural field based on a predetermined drainage tiling plan created to remove excessive water from an agricultural field. For example, a farmer may be laying drainage tiles within a field that holds on to excessive water. The farmer may enter the drainage tiling plan into a user interface similar to user interface 150 which may be received and stored by an input circuit similar to the input circuit 167. While the farmer is operating tractor 305 and the drainage implement 320, a controller circuit similar to the controller circuit 168 may receive position and/or orientation data from a position determination circuit similar to position determination circuit 165 that indicates that the height of the drainage implement 320 is too low and laying the drainage tiling too deep in the ground to address the excessive water issue. The controller circuit may then determine a control input such as a vertical position for the drainage implement 320 in order to raise the height of the drainage implement 320 to an appropriate level. The controller circuit may then communicate the control input as a control signal to the drainage implement 320 so that the vehicle may be operated to implement the control input.

Figure 5:
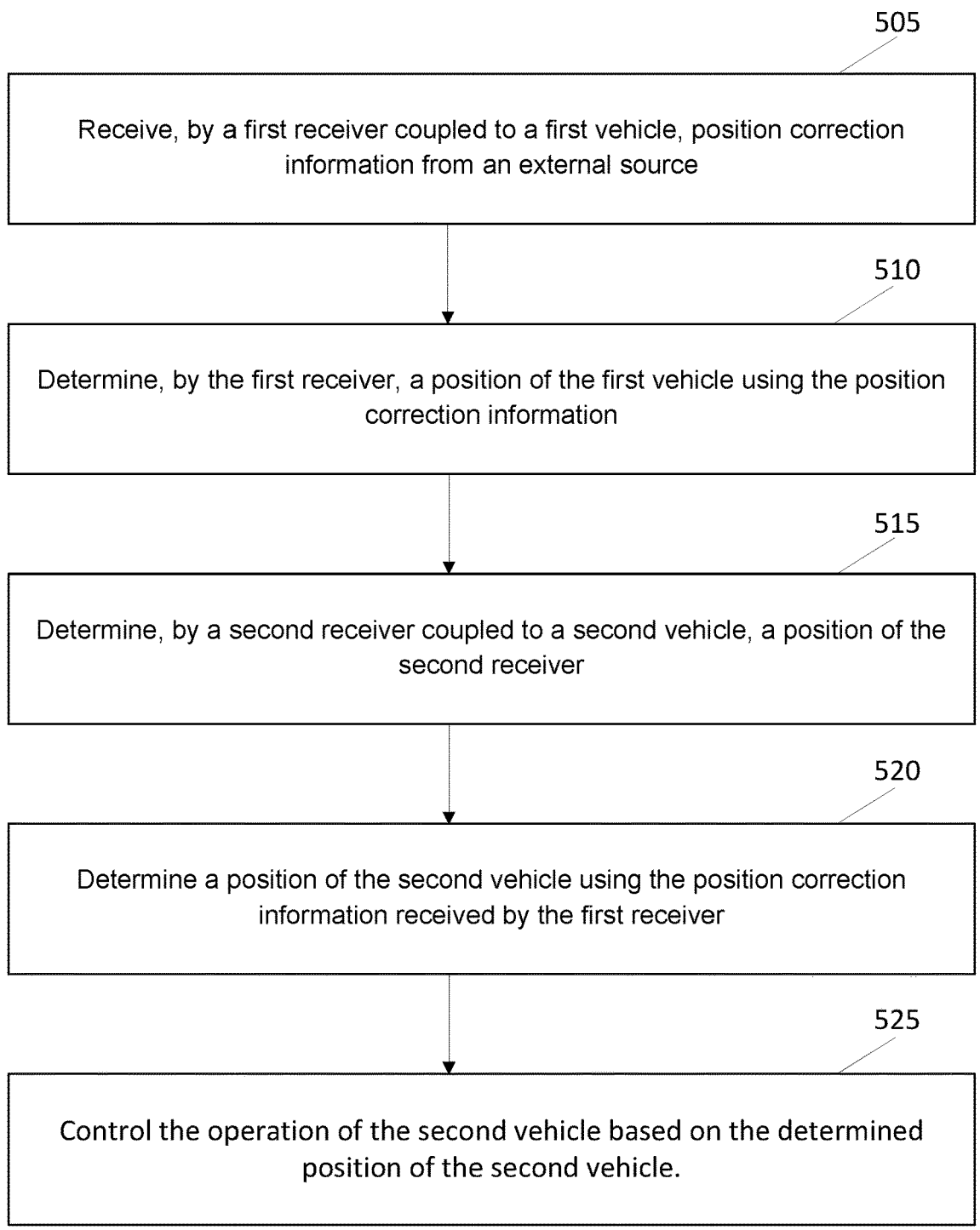
FIG. 5 is a flow diagram of a method for determining the position of an agricultural vehicle and an implement, according to an exemplary embodiment.

Referring now to FIG. 5, a method 500 for determining a highly accurate position of the first vehicle 10 and the second vehicle 20 and operating the second vehicle based on the position determination is shown, according to an exemplary embodiment. In some embodiments, the method 500 may be executed by the industrial vehicle system 100 and implemented within the first vehicle 10 and the second vehicle 20. Though the example described in the following paragraphs specifically describes method 500 as it relates to the first vehicle 10 and the second vehicle 20, this example is meant only to be exemplary. It is to be understood that the method 500 may be implemented by any other agricultural vehicle or implement (e.g., tractor 205, tractor 305, scraper implement 220, drainage implement 320, etc.).

At step 505, the first receiver 130 coupled to the first vehicle 10, receives position correction information from external accuracy source 166. In some embodiments, the external accuracy source 166 may be the RTK corrections from a base station received by the first receiver 130 after subscribing to an RTK correction subscription service and unlocking the first receiver 130 to be able to use RTK accuracy. The first receiver 130 may receive the position correction information through a variety of means. For example, the base station may use a satellite network, cellular network, and/or wireless (e.g., Wi-Fi, Bluetooth, etc.) network to communicate the position correction information to the first receiver 130. The position correction information received by the first receiver 130 may increase the accuracy of the position determined by first receiver 130 to be between 2 to 4 or 5 centimeters.

At step 510, the industrial vehicle system 100 determines a position of the first vehicle 10 using the position correction information received in step 505. More specifically, the three-dimensional position of the first vehicle 10 is determined by determining the position of the first receiver 130 which is coupled to the first vehicle 10. As mentioned above, the first receiver 130 may be a GNSS receiver structured to determine the position of the first vehicle 10 to a high degree of accuracy given that the first receiver 130 includes a receiver RTK accuracy unlock and a correction signal subscription. In some embodiments, step 510 also includes computing one or more motion characteristics (e.g., a velocity, a yaw rate, an acceleration, etc.) based on the first vehicle's position measurements.

At step 515, the industrial vehicle system 100 determines a position of the second receiver 22. As mentioned above, the second receiver 22 may be a GNSS receiver coupled to the second vehicle 20 and structured to determine the position of the second vehicle 20 by determining its own position given that the second receiver 22 is attached to the second vehicle 20. In some embodiments, the second receiver 22 determines its position in three dimensions including a determination of the vertical position of the second vehicle 20. In some embodiments, the second receiver 22 may innately have less accurate positioning capabilities than first receiver 130 because second receiver 22 may not be unlocked for RTK accuracy or receive RTK correction signals. Regardless, by using the ALIGN® firmware provided by NovAtel®, the second receiver 22 may obtain highly accurate positioning capabilities through the capabilities of the first receiver 130.

At step 520, the industrial vehicle system 100 determines a position of the second vehicle 20 using the position correction information received by the first receiver 130. As described above, the second receiver 22 may not be unlocked for RTK accuracy or receive RTK correction signals. Regardless, the position of the second vehicle 20 may still be determined with a high degree of accuracy by utilizing the high accuracy capabilities of the first receiver 130 through the ALIGN® firmware provided by NovAtel®. In some embodiments, determining the position of the second vehicle 20 may include determining the vertical position of the second vehicle 20. In some embodiments, the position of the second vehicle 20 determined at step 520 may be a position relative to the position of the first vehicle 10 as determined at step 510.

At step 525, the industrial vehicle system 100, controls the operation of the second vehicle 20 based on the position of the second vehicle 20 determined at step 520. More specifically, the vehicle control system 110 may send one or more control commands to the second vehicle 20 to control the operation of the second vehicle 20 to implement an agricultural application. For example, the vehicle control system 110 may determine and implement a vertical position command for a hydraulic system associated with the second vehicle 20 to modify the vertical position of the second vehicle 20.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may include several different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

What is claimed is:

1. A system for providing a position for an agricultural vehicle, the system comprising:
    a first receiver structured to be coupled to a first vehicle, the first receiver configured to receive position correction information from an external source and determine a first position of the first receiver in three dimensions using the position correction information;
    a second receiver structured to be coupled to a second vehicle and configured to determine a second position of the second receiver, wherein the first receiver is configured to determine the first position using the position correction information at a higher level of accuracy than the second receiver is configured to determine the second position;
    one or more processing circuits, each processing circuit including a processor and a memory, the memory having instructions stored thereon that, when executed by the processor, cause the processing circuit to determine a position of the second vehicle in three dimensions, including a vertical position of at least a portion of the second vehicle, using the position correction information received by the first receiver; and
    a plurality of second vehicles and control circuitry configured to control an operation of at least one of the second vehicle or an operation of the plurality of second vehicles based on the determined position of the second vehicle using the position correction information received by the first receiver, wherein controlling the operation of at least one of the second vehicle or the operation of the plurality of second vehicles includes commanding a hydraulic system associated with the second vehicle to modify the vertical position of the second vehicle to implement a water management application.

2. The system of claim 1, wherein the first vehicle is the agricultural vehicle, wherein the second vehicle is agricultural implement, and wherein the first vehicle is operably coupled to the second vehicle.

3. The system of claim 2, wherein the agricultural implement is at least one of a scraper, ditcher, a tile plow, or a trencher.

4. The system of claim 1, wherein the one or more processing circuits are included within at least one of the first receiver or the second receiver.

5. The system of claim 1, wherein the corrected position of the first vehicle in three dimensions generated using the position correction information from the external source is accurate is within 5 centimeters of an actual position of the first vehicle.

6. The system of claim 1, wherein the one or more processing circuits are configured to:
    determine a heading angle between the first receiver and the second receiver,
    determine a pitch angle between the first receiver and the second receiver, and
    determine a position of the second vehicle using the corrected position of the first vehicle, the heading angle, and the pitch angle.

7. The system of claim 1, wherein the one or more processing circuits are configured to:
    determine a relative position of the second vehicle relative to the position of the first vehicle based on the position correction information; and
    determine an absolute position of the second vehicle based on the position correction information received by the first receiver.

8. A method for providing a position for an agricultural vehicle comprising:
    receiving, by a first receiver coupled to a first vehicle, position correction information from an external source;
    determining, by the first receiver, a first position of the first vehicle in three dimensions using the position correction information;
    determining, by a second receiver coupled to a second vehicle, a second position of the second receiver;
    determining a position of the second vehicle in three dimensions, including a vertical position of at least a portion of the second vehicle, using the position correction information received by the first receiver; and
    controlling at least a portion of an operation of the second vehicle based on the determined position of the second vehicle in three dimensions, wherein controlling the operation of the second vehicle includes commanding a hydraulic system associated with the second vehicle to modify the vertical position of the second vehicle to implement a water management application.

9. The method of claim 8, wherein the first vehicle is an agricultural vehicle, wherein the second vehicle is agricultural implement, and wherein the first vehicle is operably coupled to the second vehicle.

10. The method of claim 9, wherein the agricultural implement is at least one of a scraper, a tile plow, or a trencher.

11. The method of claim 8, wherein the corrected position of the first vehicle in three dimensions generated using the position correction information from the external source is accurate is within 5 centimeters of an actual position of the first vehicle.

12. The method of claim 8, wherein controlling the operation of the second vehicle includes at least one of controlling a vertical position of the second vehicle or a speed of the second vehicle.

13. The method of claim 8, wherein the method further comprises:
    determining an absolute position of the first vehicle based on the position correction information received by the first receiver, and
    determining an absolute position of the second vehicle based on the position correction information received by the first receiver.

14. A computer readable media for providing a position for an agricultural vehicle comprising one or more processing circuits, each comprising one or more processors and memory storing instructions that, when executed by the one or more processors, causes the one or more processors to perform operations comprising:
    receiving, by a first receiver coupled to a first vehicle, position correction information from an external source;
    determining, by the first receiver, a first position of the first vehicle in three dimensions using the position correction information;
    determining, by a second receiver coupled to a second vehicle, a second position of the second receiver;
    determining a position of the second vehicle in three dimensions, including a vertical position of at least a portion of the second vehicle, using the position correction information received by the first receiver; and
    controlling at least a portion of an operation of a water management implement based on the determined position of the water management implement in three dimensions, controlling the operation comprising controlling the vertical position of the at least a portion of the water management implement based on the determined position.

15. The computer readable media of claim 14, wherein the water management implement is at least one of a scraper, a tile plow, or a trencher.

16. The computer readable media of claim 14, wherein the corrected position of the first vehicle in three dimensions generated using the position correction information from the external source is accurate is within 5 centimeters of an actual position of the first vehicle.

17. The computer readable media of claim 14, wherein the one or more processing circuits are configured to:
    determine a relative position of the second vehicle relative to the position of the first vehicle based on the position correction information; and
    determine an absolute position of the second vehicle based on the position correction information received by the first receiver.

18. The computer readable media of claim 14, wherein are configured to:
    determine a heading angle between the first receiver and the second receiver,
    determine a pitch angle between the first receiver and the second receiver, and
    determine a position of the second vehicle using the corrected position of the first vehicle, the heading angle, and the pitch angle.

* * * * *